United States Patent
Takeda et al.

(10) Patent No.: US 10,638,502 B2
(45) Date of Patent: Apr. 28, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/755,412

(22) PCT Filed: Aug. 22, 2016

(86) PCT No.: PCT/JP2016/074391
§ 371 (c)(1),
(2) Date: Feb. 26, 2018

(87) PCT Pub. No.: WO2017/038532
PCT Pub. Date: Mar. 9, 2017

(65) Prior Publication Data
US 2018/0255568 A1  Sep. 6, 2018

(30) Foreign Application Priority Data
Aug. 31, 2015 (JP) ................. 2015-171452

(51) Int. Cl.
*H04W 72/12* (2009.01)
*H04W 24/10* (2009.01)

(52) U.S. Cl.
CPC ....... *H04W 72/1289* (2013.01); *H04W 24/10* (2013.01); *H04W 72/1268* (2013.01); *H04W 72/1273* (2013.01); *H04W 72/1263* (2013.01)

(58) Field of Classification Search
CPC ............................ H04W 72/14; H04L 5/0055
(Continued)

(56) References Cited

U.S. PATENT DOCUMENTS 8,000,272 B2  8/2011 Gao et al.
2013/0201884 A1* 8/2013 Freda ................. H04W 72/005
370/278
(Continued)

FOREIGN PATENT DOCUMENTS

EP  2056616 A1  5/2009
WO  2009/022314 A2  2/2009
(Continued)

OTHER PUBLICATIONS

3GPP TS 36.300 v12.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); Dec. 2014; 251 pages.
(Continued)

*Primary Examiner* — Iqbal Zaidi
(74) *Attorney, Agent, or Firm* — Osha Liang LLP

(57) ABSTRACT

There is provided a user terminal capable of realizing a low delay communication in the next generation mobile communication system, including: a reception section that receives at least one downlink control information out of first downlink control information for scheduling reception of downlink data and second downlink control information for scheduling transmission of uplink data; and a control section that controls to perform reception of the downlink data and/or transmission of the uplink data corresponding to the downlink control information at a predetermined transmission time interval (TTI), wherein the control section is configured to set the predetermined TTI to the same TTI based on the TTI that has received the downlink control information, regardless of whether the downlink control information is the first downlink control information or the second downlink control information.

3 Claims, 11 Drawing Sheets

(58) Field of Classification Search
USPC .................................................. 370/252–412
See application file for complete search history.

(56) References Cited

U.S. PATENT DOCUMENTS

| | | | |
|---|---|---|---|
| 2013/0322235 A1* | 12/2013 | Khoryaev | H04W 24/10 370/229 |
| 2014/0293893 A1* | 10/2014 | Papasakellariou | H04W 72/04 370/329 |
| 2014/0376471 A1* | 12/2014 | Nishio | H04W 52/367 370/329 |
| 2016/0345332 A1* | 11/2016 | Cheng | H04L 5/001 |

FOREIGN PATENT DOCUMENTS

| | | | |
|---|---|---|---|
| WO | 2009022314 | A2 | 2/2009 |
| WO | 2009/090583 | A1 | 7/2009 |

OTHER PUBLICATIONS

International Search Report issued in International Application No. PCT/JP2016/074391, dated Nov. 8, 2016 (4 pages).
Written Opinion issued in International Application No. PCT/JP2016/074391, dated Nov. 8, 2016 (3 pages).
Extended European Search Report issued in counterpart European Patent Application No. 16841564.4, dated Mar. 14, 2019 (8 pages).
Smee, J.E., "5G Design Across Services"; Qualcomm Technologies, Inc., May 2015 (23 pages).
Office Action in counterpart European Application No. 16841564A, dated Dec. 18, 2019 (6 pages).

* cited by examiner

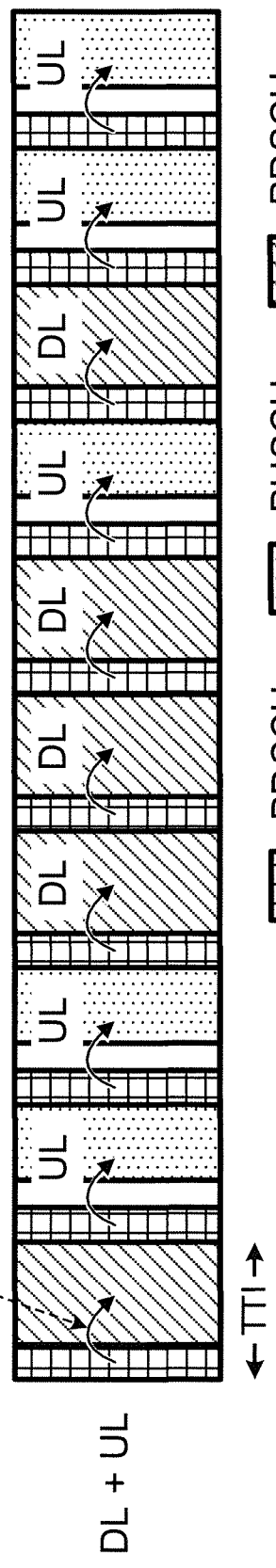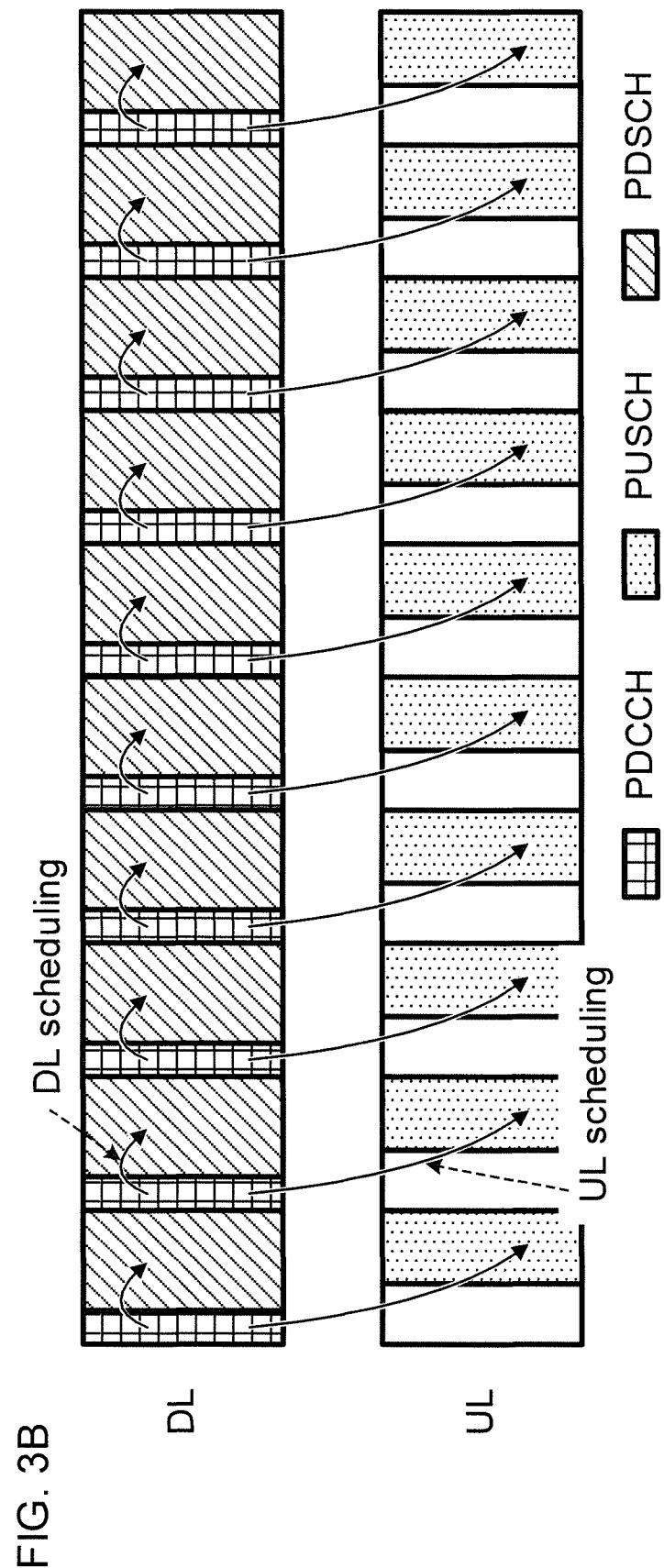

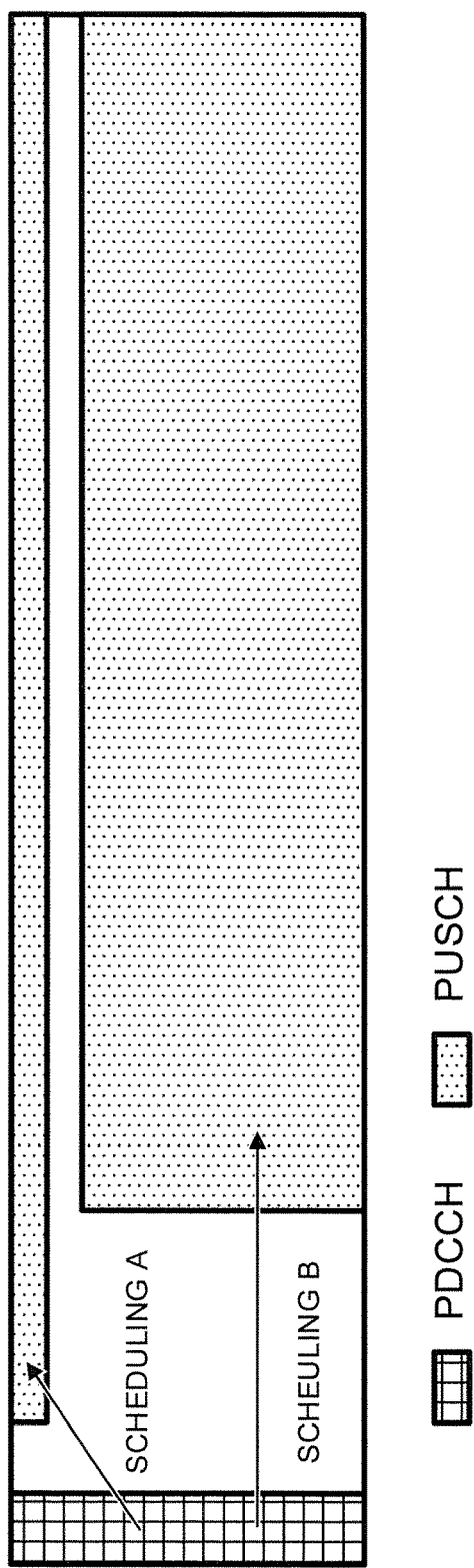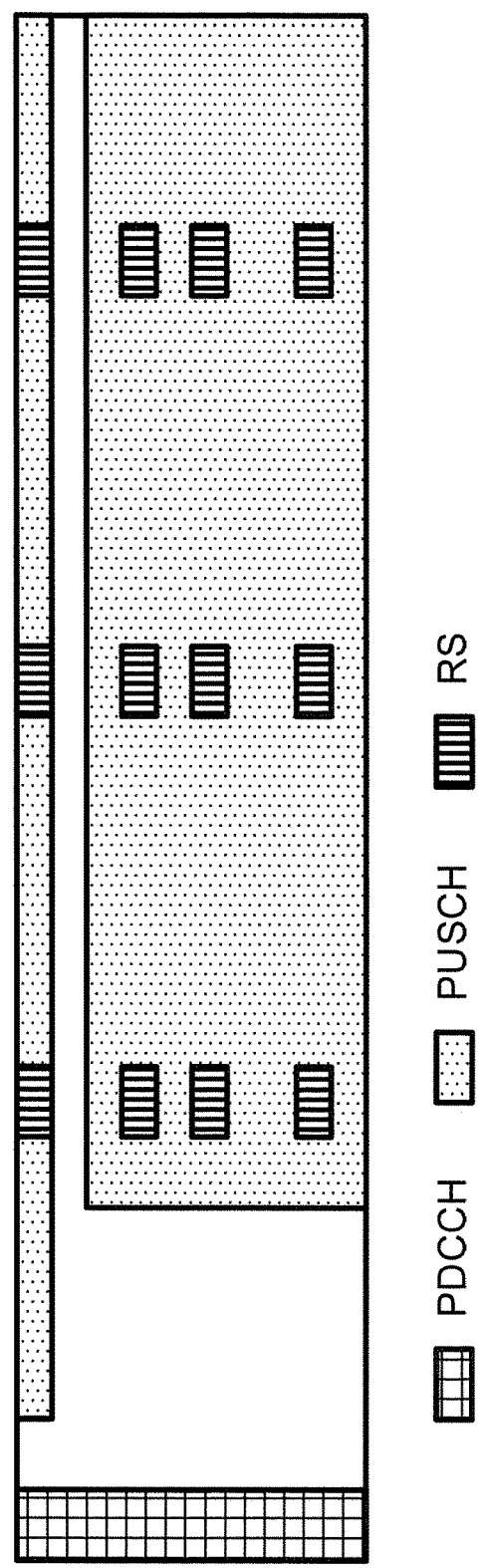
FIG. 5A
FIG. 5B

USER TERMINAL, RADIO BASE STATION AND RADIO COMMUNICATION METHOD

TECHNICAL FIELD

The present invention relates to a user terminal, a radio base station and a radio communication method in the next generation mobile communication system.

BACKGROUND ART

In UMTS (Universal Mobile Telecommunications System) network, Long Term Evolution (LTE) is specified for the purpose of further high data rate and low delay, etc. (Non-Patent Document 1). In addition, for the purpose of further broadening and speeding up from the LTE, the successor system of LTE (for example, LTE-A (LTE-Advanced), FRA (Future Radio Access), 5G (5th generation mobile communication system), and New-RAT (Radio Access Technology), etc.) are also being studied.

In the radio communication system after LTE Rel. 13 (5G, for example), in order to make use of the given frequency spectrum more flexibly and effectively, introduction of a flexible duplex system that enables each subframe to be dynamically available as DL or UL has been studied. Flexible duplex does not prescribe DL/UL in advance for time/frequency resources, but dynamically changes DL/UL according to various conditions such as traffic and channel conditions.

CITATIONS LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

However, in a scheduling of data transmission/reception in the existing LTE, it is more preferable to secure future radio resources at an earlier timing, and therefore flexibility of the flexible duplex is not maximized, thus involving a problem that low delay communication is not achieved.

In view of the above points, the present invention is made, and an object of the present invention is to provide a user terminal, a radio base station and a radio communication method capable of realizing a low delay communication in the next generation mobile communication system.

Solution to Problem

According to an aspect of the present invention, there is provided a user terminal, including:
a reception section that receives at least one downlink control information out of first downlink control information for scheduling reception of downlink data and second downlink control information for scheduling transmission of uplink data; and
a control section that controls to perform reception of the downlink data and/or transmission of the uplink data corresponding to the downlink control information at a predetermined transmission time interval (TTI),
wherein the control section is configured to set the predetermined TTI to the same TTI based on the TTI that has received the downlink control information, regardless of whether the downlink control information is the first downlink control information or the second downlink control information.

Advantageous Effects of Invention

According to the present invention, low delay communication may be realized in the next generation mobile communication system.

BRIEF DESCRIPTION OF DRAWINGS

FIG. 3A is a view illustrating an example of a radio resource assignment when the same frequency carrier is scheduled by DL grants and UL grants, and FIG. 3B is a view illustrating an example of a radio resource assignment when the same frequency carrier is scheduled by DL grants and different frequency carriers are scheduled by UL grants.

FIG. 5A is a view illustrating an example of an assignment of only PDCCH for transmitting the UL grant and PUSCH for transmitting data, and FIG. 5B is a view illustrating an example of a resource assignment of uplink reference signals (RS).

DESCRIPTION OF EMBODIMENTS

In the existing LTE system (Rel. 8-12), a radio base station (eNB: evolved Node B) schedules data transmission/reception for a user terminal (UE: User Equipment) using a downlink control channel. Specifically, DL scheduling and UL scheduling based on downlink control information (DCI: Downlink Control Information) reported by PDCCH (Physical Downlink Control Channel)/EPDCCH (Enhanced PDCCH) are prescribed.

Figure 1:
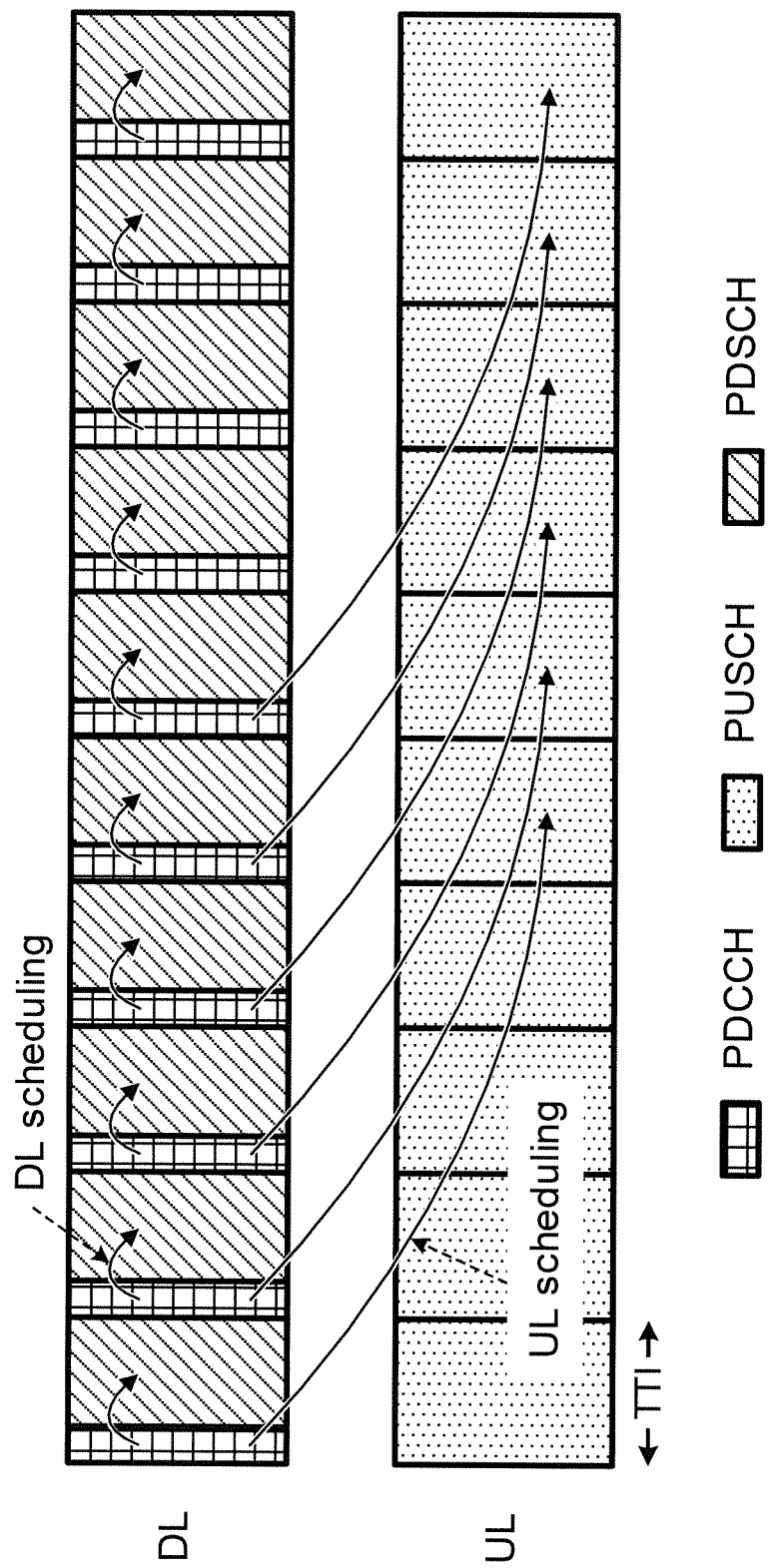
FIG. 1 is a view illustrating an example of data scheduling in the existing LTE system.

FIG. 1 is a view illustrating an example of data scheduling in the existing LTE system. FIG. 1 illustrates DL scheduling and UL scheduling indicated by DCI received by PDCCH. As illustrated in FIG. 1, UE receives PDSCH (Physical Downlink Shared Channel) based on a DL grant at the same subframe as the subframe that detects the DL grant (referred to as a DL assignment (Downlink assignment)) which follows the DCI format 1A, etc., for example.

Further, UE transmits PUSCH (Physical Uplink Shared Channel) based on a UL grant at the subframe after a predetermined period (for example, four subframes later) from the subframe that detects the UL grant (uplink grant) which follows the DCI format 0/4 for example.

FIG. 1 illustrates an example of reporting DL/UL grant by PDCCH, wherein even in the case of the EPDCCH, the correspondence relationship between the scheduling transmission time interval (TTI: Transmission Time Interval) and the scheduled TTI is the same as in FIG. 1. In addition, carriers (for example, component carriers (CCs)) that transmit and receive DL grants and PDSCHs may not be the same, but may be different carriers. In addition, carriers that transmit and receive UL grants and PUSCHs may be the same.

The existing LTE system uses control based on TDD (Time Division Duplexing) and FDD (Frequency Division Duplexing). Specifically, it is strictly stipulated whether the time/frequency resource is used for DL or UL for every predetermined section (for example, subframe as time resource, CC as frequency resource, etc.).

Incidentally, in the radio communication system after LTE Rel. 13 (for example 5G), in order to make use of the given frequency spectrum more flexibly and effectively, introduction of a flexible duplex system that enables each subframe to be dynamically available as DL or UL has been studied. Flexible duplex does not prescribe DL/UL in advance for time/frequency resources, but dynamically changes DL/UL according to various conditions such as traffic and channel conditions.

Figure 2:
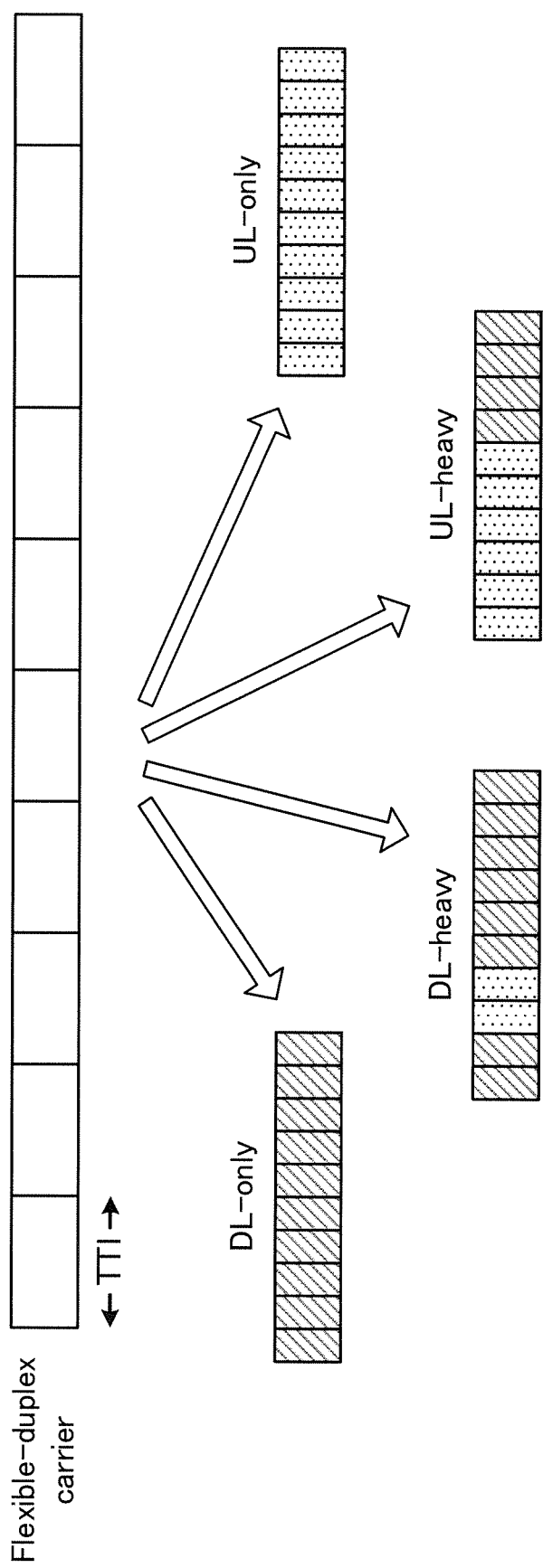
FIG. 2 is a view illustrating an example of a radio resource assignment in a carrier using Flexible duplex.

FIG. 2 is a view illustrating an example of a radio resource assignment in a carrier using Flexible duplex. FIG. 2 illustrates radio resources for 10 TTIs. As illustrated in FIG. 2, the carrier using Flexible duplex may be used, for example in such a manner that a frequency spectrum is divided into DL-only (downlink transmission only), UL-only (uplink transmission only), DL-heavy (the ratio of downlink transmission is large), and UL-heavy (the ratio of uplink transmission is large).

FDD operation may also be performed by using two frequency carriers of DL-only and UL-only in combination, and TDD operation may be performed by using DL+UL setting.

However, it has not yet been studied how to actually realize Flexible duplex. For example, when attempting to perform control to realize Flexible duplex by the LTE system, there is a problem that the scheduling timing (number of TTIs from scheduling TTI to scheduled TTI) is different between DL and UL as described above.

For example, in the existing LTE, UL resources ahead of several subframes are reserved at the scheduling timing for reporting the UL grant. Therefore, when it is time to transmit the resource, even when it is desired to make another assignment at this time (change the assignment), such an assignment may not be done.

As described above, in the scheduling of the existing LTE system, the flexibility of the flexible duplex is not maximized, and it is conceivable that the frequency use efficiency and throughput may not be improved, and it becomes difficult to suppress the delay associated with retransmission.

Therefore, the inventors of the present invention focus on the fact that when using control over TTIs (subframes) (inter-subframe scheduling), temporally old control restricts newer control (later time control), and also focus on the fact that scheduling between subframes requires scheduling in consideration of future control contents in advance.

Based on these points, the inventors of the present invention reach an idea of reducing the scheduling timing as much as possible. Specifically, the inventors of the present invention achieve a technique of transmitting and receiving UL grants and uplink data at the same TTI. Further, it is also found that the scheduling timing is the same regardless of DL/UL scheduling. According to an aspect of the present invention, UE is preferably instructed to schedule the most recent time in a unified manner, and therefore the dynamic control of the DL/UL of each TTI may be effectively realized. In addition, RTT (Round Trip Time) of HARQ is preferably suitably shortened.

Hereinafter, embodiments of the present invention will be described in detail with reference to the drawings. The radio communication methods according to the respective embodiments may be used individually or in combination.

Hereinafter, similarly to the case of the existing LTE system, explanation will be given for a case in which the downlink control information is reported by PDCCH using the first several symbols, but the application of the present invention is not limited thereto. For example, the downlink control information may be reported by EPDCCH multiplexed in a PDSCH region, or may be reported by other channels or other radio resources.

In the following embodiments, TTI may be a subframe (1 ms) in the existing LTE, or may be a period shorter than 1 ms (for example, 1-13 symbols), or a period longer than 1 ms.

Note that the downlink control information (which may be referred to as uplink scheduling information, uplink scheduling control information, and the like) for scheduling transmission of uplink data is referred to as UL grant and downlink control information (which may be referred to as downlink scheduling information, downlink scheduling control information, DL assignment, and the like) for scheduling reception of downlink data may be referred to as DL grant, but the designation is not limited thereto. Further, the downlink control information (downlink control signal) may be referred to as L1/L2 (Layer 1/Layer 2) control information (L1/L2 control signal), or simply as L1 control information (L1 control signal).

(Radio Communication Method)
<First Embodiment>

In the first embodiment of the present invention, eNB notifies UE of the downlink control information (scheduling information) indicating the radio resource to be assigned to a predetermined TTI (for example, subframe). Here, regardless of whether the downlink control information is the UL grant or the DL grant, eNB performs control so that assignment of the radio resource is performed at the same TTI based on the TTI that transmits the downlink control information. In addition, regardless of whether the detected downlink control information is the UL grant or the DL grant, UE performs control so that transmission/reception is performed at the same TTI based on the TTI that has received the downlink control information.

FIG. 3 is a view illustrating an example of scheduling according to the first embodiment. FIG. 3A illustrates an example of a radio resource assignment when scheduling the same frequency carrier by the DL grant and the UL grant. FIG. 3B illustrates an example of a radio resource assignment when the same frequency carrier is scheduled by the DL grant and a different frequency carrier is scheduled by the UL grant. In both examples of FIG. 3, scheduling of data transmission and reception is performed at the same TTI as the TTI that has reported the downlink control information.

In the first embodiment, UE monitors and receives L1 control signals using a predetermined frequency carrier. When the received L1 control information includes DL grant addressed to its own terminal, DL data is received at TTI that receives the DL grant. When the UL grant addressed to its own terminal is included in the L1 control signal, UL data is received at TTI that receives the UL grant. The reception of the DL/UL grant and the transmission/reception of the DL/UL data may be performed at the same TTI as illustrated in FIG. 3, or may be performed at different TTIs as described later in FIG. 4.

When the UL grant is received, it is preferable to provide a non-transmission period (for example, a guard period (GP), a gap, a GP section, or the like) for TTI to be scheduled. By setting the guard period, DL/UL may be switched within TTI. When the scheduled TTI and the scheduling TTI are the same, the guard period may be the time from when the downlink control information is received (when the reception is completed) to when the transmission of data is started. In addition, the guard period may be the time from start of TTI (=start timing of TTI) to start of transmission of data.

The guard period may be, for example, 20 μs or one or more symbol periods. Here, the symbol period may be expressed by OFDM (Orthogonal Frequency Division Multiplexing) symbol units for example, or may be expressed by units of reciprocals (specifically, sampling lengths) of a bandwidth, or by other units. In addition, the length of the non-transmission period may be different or may be the same, between a case of scheduling of the same frequency carrier (FIG. 3A) and a case of scheduling of different frequency carriers (FIG. 3B). When different frequency carriers are scheduled, the guard period may be equal to or longer than a period (for example, three symbols at maximum) or more, which is a PDCCH transmittable period.

Figure 4:
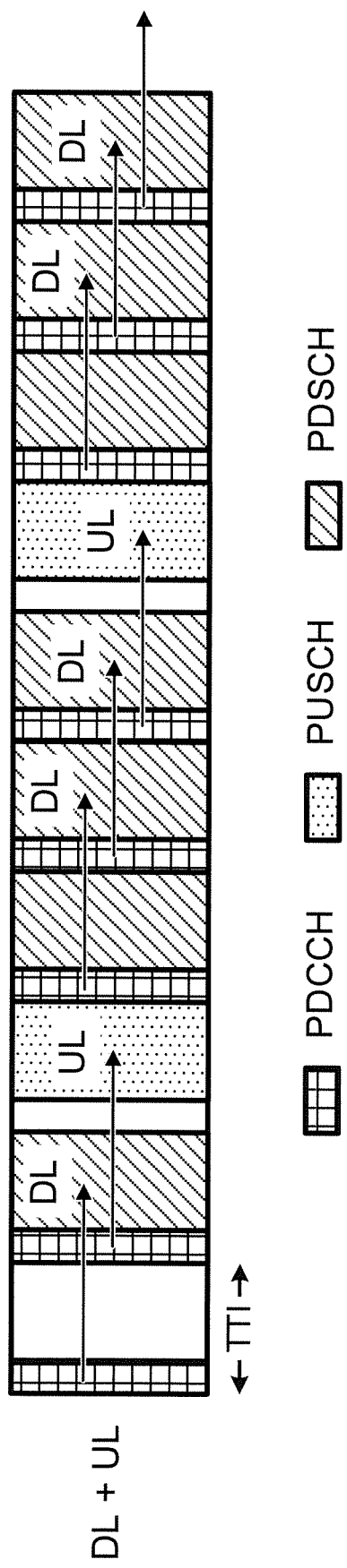
FIG. 4 is a view illustrating another example of scheduling according to a first embodiment.

FIG. 4 is a view illustrating another example of the scheduling according to the first embodiment. FIG. 4 illustrates an example of the radio resource assignment when the same frequency carrier is scheduled by the DL grant and by the UL grant. In the example of FIG. 4, scheduling of data transmission and reception is performed at the TTI neighboring to the TTI (one TTI later) notified of the downlink control information. In this way, the configuration for performing scheduling in the neighboring TTI by the downlink control information is suitable, for example, in a situation when the downlink control information is reported by EPDCCH, because the scheduling TTI may be set for DL only and the scheduled TTI may be set for UL only.

The number of TTIs from the scheduling TTI to the scheduled TTI may be different depending on whether it is notified of the downlink control information by PDCCH or EPDCCH. For example, when notified of the downlink control information by PDCCH, UE assumes that the number of TTIs is zero (scheduling within the same subframe) and performs transmission/reception processing, and on the other hand, when notified of the downlink control information by EPDCCH, the transmission/reception processing may be performed assuming that the TTI number is one (scheduling in the neighboring subframe). Flexibility of scheduling is thus enhanced.

As illustrated in FIG. 3B, when detecting assignment of both DL grant and UL grant for performing scheduling of different frequency carriers in the same TTI, UE judges that both grants are valid and may perform data transmission and data reception by different frequency carriers of the same TTI.

In addition, when detecting assignment of both DL grant and UL grant in the same TTI of the same frequency carrier, UE ignores the UL grant, judges that the DL grant is valid, and may perform reception of downlink data based on the DL grant. In this way, for example, occurrence of interference with other users is preferably avoided at the same frequency and/or spatially multiplexed in the same TTI of the same cell. On the other hand, when detecting assignment of both the DL grant and the UL grant in the same TTI of the same frequency carrier, UE ignores the DL grant and judges that the UL grant is valid, and may perform transmission of the uplink data based on the UL grant. In this way, for example, UL data having a greater influence of delay is preferably processed early, thereby improving the user's perceived speed.

In addition, when detecting that scheduling is performed by both the DL grant and the UL grant in a predetermined TTI of the same frequency carrier, UE ignores the UL grant, judges that the DL grant is valid, and may receive the downlink data based on the DL grant. On the other hand, when detecting that scheduling is performed by both the DL grant and the UL grant in a predetermined TTI of the same frequency carrier, UE ignores the DL grant, judges that the UL grant is valid, and may transmit the uplink data based on the UL grant.

Further, when detecting that scheduling is performed by a plurality of grants in a predetermined TTI of the same frequency carrier, UE may judge that the latest grant is valid, or may judge which is an effective grant based on a predetermined rule, or may judge that the oldest grant is valid. Then, the UE may transmit/receive data based on the grant judged to be valid.

In addition, UE may be notified of the information regarding scheduling (for example, the number of TTIs from the scheduling TTI to the scheduled TTI), by upper layer signaling (for example, RRC (Radio Resource Control) signaling, and broadcast information (MIB (Master Information Block), SIB (System Information Block)), etc.). In addition, UE may judge the information regarding the scheduling by reporting another information, or may judge the information from the set frequency carrier.

As described above, according to the first embodiment, the time from when the radio base station reports the scheduling information to when the UE performs transmission and reception based on the information, is preferably suitably reduced.

<Second Embodiment>

A certain processing time is preferably set from when the UE receives the UL grant to when the PUSCH transmission becomes enabled. For example, as a process for generating a data signal to be transmitted by PUSCH, encoding and modulation processing are preferably desired. When TBS (Transport Block Size), which is a data transmitting/receiving section, is increased, the processing time is increased. In addition, in order to transmit the uplink signal, there is a possibility that calculation of transmission power and excess transmission power (power headroom) is also performed after reception of the UL grant.

Accordingly, particularly when TBS of the uplink data is large, there is a possibility that it is difficult to transmit PUSCH immediately after receiving the UL grant. Therefore, a second embodiment is found by the inventors of the present invention by focusing on a point that the guard period length (GP length) is made variable for the TTI in which scheduling is performed by UL grant as described in the first embodiment.

In the second embodiment of the present invention, UE judges and uses the GP length (which may be referred to as a GAP length) for every UL grants, the GP length being the length between reception of the UL grant and transmission of the UL grant. For example, UE may judge the GP length based on UE capability, TBS, a coding system (for example, turbo coding), a cell radius of the connected cell, a transmission timing (for example, timing advance) to be applied to its own terminal, etc., or a combination of them. UE may shorten the GP length when the TBS of the transmission data is small, and may increase the length when the TBS is large. Here, a variable-length GP in the second embodiment may be called Flexible GP.

FIG. 5 is a view illustrating an example of an uplink resource assignment according to the second embodiment. FIG. 5A is a view illustrating an example of the assignment of PDCCH only for transmitting UL grant and PUSCH only for transmitting data. Scheduling A and scheduling B illustrated in FIG. 5A illustrates the scheduling of UL transmission based on different UL grants respectively. Note that such scheduling is illustrated in one view for the sake of simplicity and it is not necessary for them to occur in the same TTI. In addition, the radio resource to which data is assigned is not limited to the configuration of FIG. 5A.

In each scheduling, the GP length is different. Scheduling A is, for example, a state in which TBS corresponding to the UL grant is small, and the GP length is short. On the other hand, scheduling B is, for example, a state in which the TBS corresponding to the UL grant is large, and the GP length is long. In FIG. 5B and FIG. 6 described later, similarly to FIG. 5A, radio resource mapping related to these two scheduling is exemplified.

Here, in the examples of FIGS. 5 and 6, it is assumed that the guard period is defined within a predetermined range, and the guard periods of scheduling A and B correspond to the minimum value and the maximum value of the predetermined range.

As illustrated in FIG. 5A, the time resources available for data transmission may be increased for the data transmission with a short GP length, and therefore uplink frequency resources may be configured to be relatively narrow. On the other hand, by configuring the uplink frequency resources relatively widely for the data transmission with a long GP length, the radio resources are preferably secured and data is preferably transmitted even when the time resources available for the data transmission are decreased.

FIG. 5B is a view illustrating an example of a resource assignment of an uplink reference signal (RS: Reference Signal). According to the second embodiment, in the TTI for uplink transmission, UE performs control so as to transmit RS using predetermined (for example, synchronized with the subframe) radio resources (time and/or frequency resources) not depending on the GP length (and PUSCH resource assignment). FIG. 5B illustrates an example of mapping by UE so that RS is arranged after the longest guard period in the TTI for scheduling by UL grant, but when the guard period is minimum, RS may be arranged thereafter.

In this manner, with a configuration of mapping RS at a fixed timing/position even between different cells (or even between different UEs when Multi User Multi Input Multi Output (MU-MIMO) is applied to UE), the uplink signal of UEs in eNB is preferably separated and randomization of inter-cell interference is preferably realized.

The uplink reference signal to be arranged to a fixed resource may be, for example, a measurement reference signal (SRS: Sounding Reference Signal), a demodulation reference signal (DMRS: DeModulation Reference Signal), or another reference signal. In addition, a reference signal (which may be called eSRS (enhanced SRS), for example) arranged to a discontinuous frequency resource may be used as the reference signal for measurement.

Figure 6A:
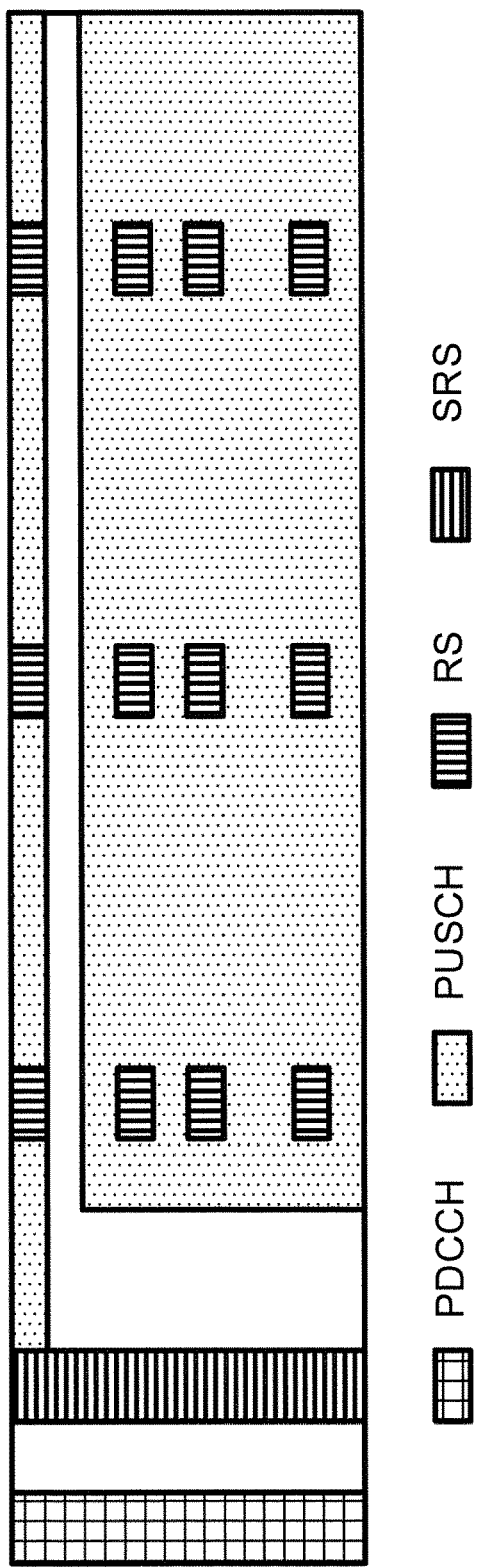
FIG. 6A is a view illustrating an example of a resource assignment of SRS.

FIG. 6 is a view illustrating another example of the uplink resource assignment according to the second embodiment. FIG. 6A is a view illustrating an example of the resource assignment of the SRS. In this example, UE transmits SRS/eSRS immediately after elapse of the minimum guard period in a predetermined TTI (for example, TTI scheduled by UL grant). For example, since SRS/eSRS does not require encoding processing unlike data, it may be transmitted from a first transmittable timing when TBS is minimum. Even in the TTI that is not subject to scheduling by UL grant (data transmission is not performed), SRS/eSRS transmission may be performed at this timing.

Since SRS/eSRS is a reference signal, complicated transmission signal processing is not required, and transmission may be performed in a short time. Therefore, by arranging the SRS/eSRS at a relatively early transmission timing within TTI, the resources at a relatively later transmission timing may be used for another signal assignment, and reduction of a frequency use efficiency is preferably suppressed.

Figure 6B:
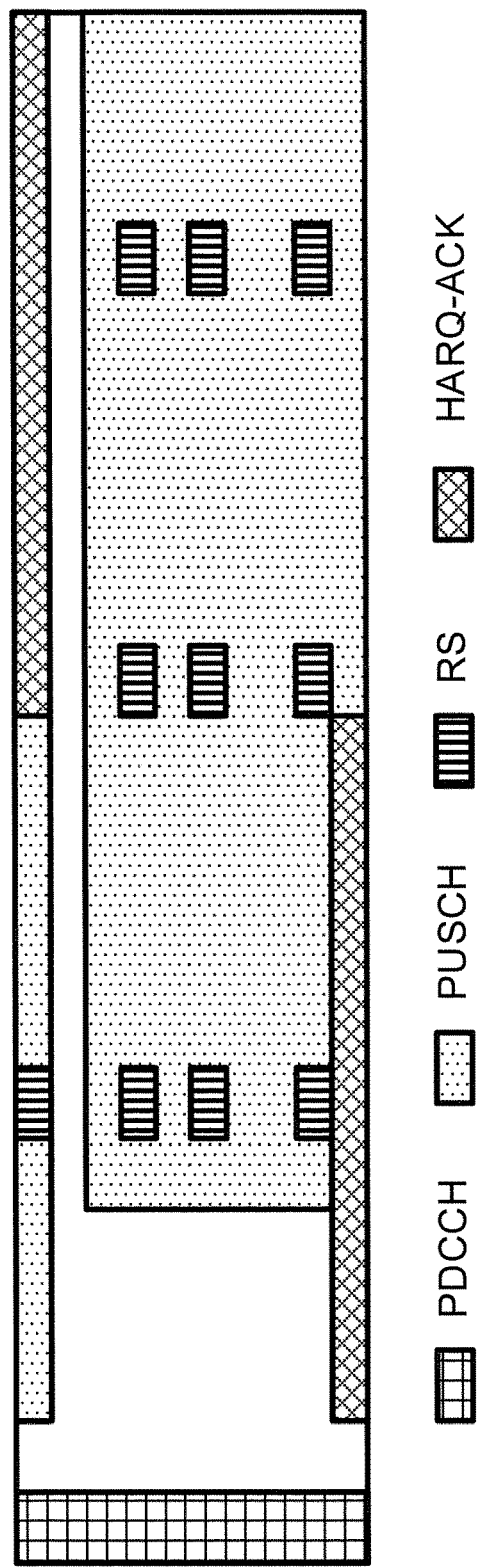
FIG. 6B is a view illustrating an example of a resource assignment of acknowledgment information of HARQ (Hybrid Automatic Repeat reQuest).

FIG. 6B is a view illustrating an example of a resource assignment of acknowledgment information (referred to as retransmission control information, HARQ-ACK, ACK/NACK, etc.) of HARQ (Hybrid Automatic Repeat reQuest). In this example, at a predetermined TTI (for example, TTI scheduled by UL grant), UE starts transmission of ACK/NACK immediately after the minimum guard period has elapsed. For example, ACK/NACK may be transmitted from a first transmittable timing when TBS is minimum. Even in the TTI that is not subject to scheduling by UL grant (data transmission is not performed), ACK/NACK transmission may be performed at this timing.

ACK/NACK may be ACK/NACK for the downlink data of the TTI (immediately preceding TTI) just before the ACK/NACK is transmitted, or may be ACK/NACK for the downlink data of further preceding TTI (second, third, and fourth preceding TTI).

As illustrated in FIG. 6B, ACK/NACK may be transmitted in a predetermined narrow band narrower than a system bandwidth. In addition, ACK/NACK may support frequency hopping. As a result, frequency diversity effect is preferably obtained for ACK/NACK transmission and coverage of UE is preferably expanded.

In the radio resource (timing) in which the assignment of SRS/eSRS and ACK/NACK occurs at the same time, one transmission may be prioritized and the other transmission may be dropped. For example, when ACK/NACK is transmitted from the first transmittable timing when TBS is minimum, SRS/eSRS transmission may be dropped at this timing, or transmission may be performed while avoiding ACK/NACK resources.

In addition, in the TTI where transmission of ACK/NACK occurs simultaneously with transmission of the uplink data, the UE determines an ACK/NACK resource (frequency/time resource) based on the GP length corresponding to the transmission of the uplink data.

ACK/NACK is the information including a simple bit sequence for example, and complicated transmission signal processing is not required, so that transmission may be performed in a short time. Accordingly, by arranging the ACK/NACK from a relatively early transmission timing within the TTI, the resource of a relatively late transmission timing is preferably used for another signal assignment, and reduction of the frequency use efficiency is preferably suppressed.

As described above, according to the second embodiment, the GP length is adjusted so as to ensure the processing time for generating PUSCH, and therefore the PUSCH transmission is appropriately performed.

In the above example of the second embodiment, explanation is given for a case in which reception of the UL grant and transmission of data occur at the same TTI. However, even when reception of the UL grant and transmission of data occur in different TTIs (neighboring TTIs), the method described in the second embodiment may be applied.

(Radio Communication System)

Hereinafter, a configuration of a radio communication system according to an embodiment of the present invention will be described. In this radio communication system, communication is performed using any one or a combination of the radio communication methods according to each of the above embodiments of the present invention.

Figure 7:
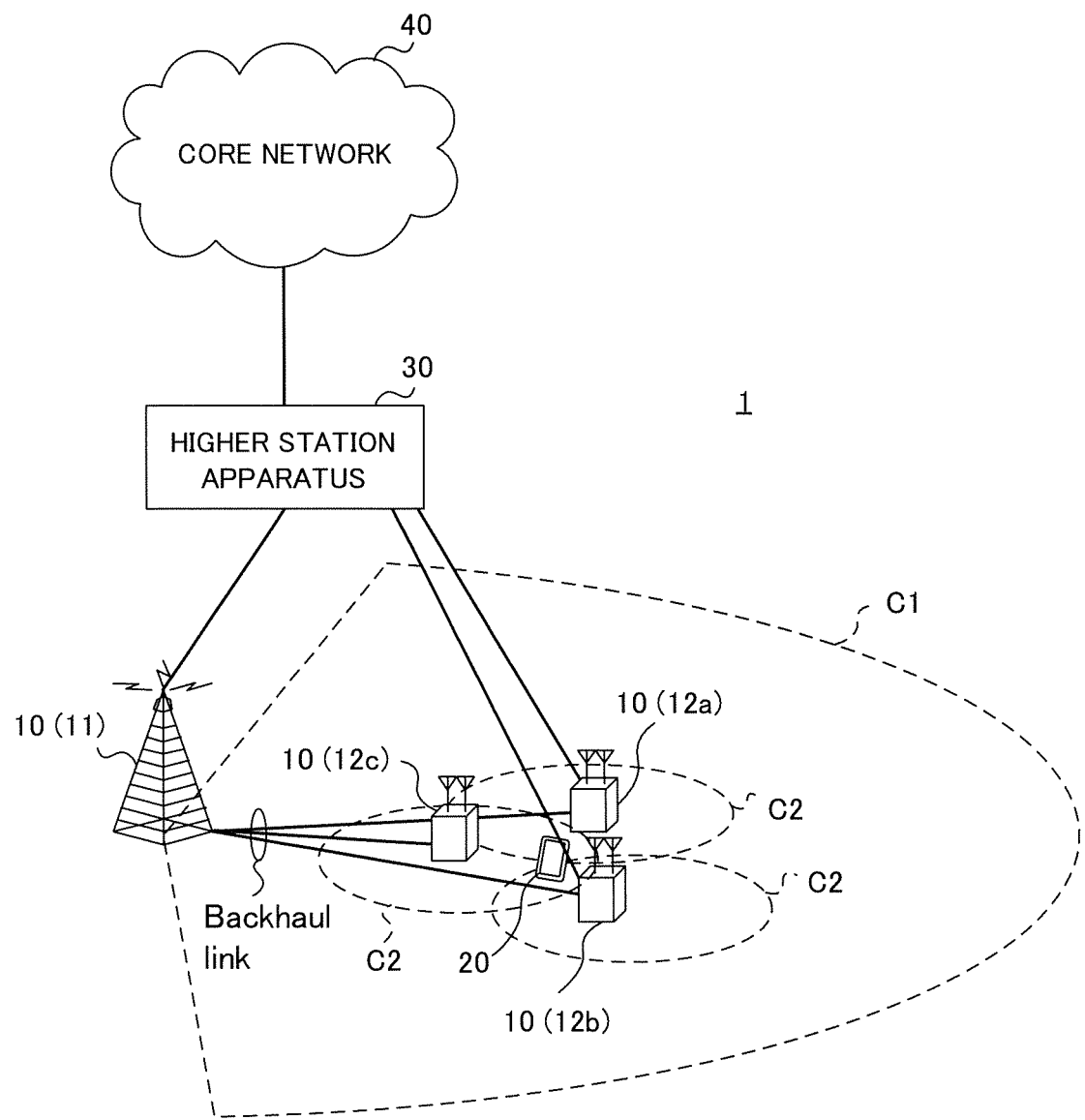
FIG. 7 is a view illustrating an example of a schematic configuration of a radio communication system according to an embodiment of the present invention.

FIG. 7 is a view illustrating an example of a schematic configuration of the radio communication system according to an embodiment of the present invention. In the radio communication system 1, carrier aggregation (CA) and/or dual connectivity (DC) is preferably used, which integrates a plurality of fundamental frequency blocks (component carriers), with a system bandwidth (for example, 20 MHz) of the LTE system as one unit.

Note that the radio communication system 1 may be referred to as LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), or the like, or may be referred to as a system that realizes them.

The radio communication system 1 illustrated in FIG. 7 includes a radio base station 11 that forms a macro cell C1 having a relatively wide coverage, and a radio base station 12 (12a-12c) arranged in the macro cell C1 and forming a small cell C2 narrower than the macro cell C1. In the macro cell C1 and the small cell C2, a user terminal 20 is arranged.

The user terminal 20 is connected to both the radio base station 11 and the radio base station 12. It is assumed that the user terminal 20 simultaneously uses the macro cell C1 and the small cell C2 by CA or DC. Further, the user terminal 20 may apply CA or DC using a plurality of cells (CC) (for example, five or less CCs, six or more CCs).

Communication is performed between the user terminal 20 and the radio base station 11 by using a carrier having a relatively low frequency band (for example, 2 GHz) and having a narrow bandwidth (referred to as existing carrier, legacy carrier, etc.). On the other hand, a carrier having a relatively high frequency band (for example, 3.5 GHz, 5 GHz, etc.) and having a wide bandwidth may be used, or the same carrier as the carrier between the user terminal 20 and the radio base station 11 may be used, between the user terminal 20 and the radio base station 12. The configuration of the frequency band used by each radio base station is not limited thereto.

Configuration between the radio base station 11 and the radio base station 12 (or between the two radio base stations 12) is a wired connection (for example, an optical fiber, X2 interface, etc., conforming to CPRI (Common Public Radio Interface), or may be a wireless connection.

The radio base station 11 and the radio base station 12 are respectively connected to a higher station apparatus 30 and are connected to a core network 40 via the higher station apparatus 30. The higher station apparatus 30 includes, for example, an access gateway device, a radio network controller (RNC), a mobility management entity (MME), and the like, but is not limited thereto. Further, each radio base station 12 may be connected to the higher station apparatus 30 via the radio base station 11.

The radio base station 11 is a radio base station having relatively wide coverage and may be referred to as a macro base station, an aggregation node, an eNB (eNodeB), a transmission/reception point, and the like. In addition, the radio base station 12 is a radio base station having local coverage and may be referred to as a small base station, a micro base station, a pico base station, a femto base station, a HeNB (Home eNodeB), a RRH (Remote Radio Head), a transmission/reception point, and the like. Hereinafter, the radio base stations 11 and 12 are collectively referred to as a radio base station 10 when they are not distinguished from each other.

Each user terminal 20 is a terminal responding to various communication systems such as LTE, LTE-A, and may include not only a mobile communication terminal but also a fixed communication terminal.

In the radio communication system 1, Orthogonal Frequency Division Multiple Access (OFDMA) is applied to the downlink, and Single Carrier-Frequency Division Multiple Access (SC-FDMA) is applied to the uplink as radio access systems. OFDMA is a multicarrier transmission system in which a frequency band is divided into a plurality of narrow frequency bands (subcarriers) and data is mapped in each subcarrier to perform communication. SC-FDMA is a single-carrier transmission system that reduces interference between terminals by dividing the system bandwidth into one band or a band composed of consecutive resource blocks, for every terminals, so that a plurality of terminals may use mutually different bands. Note that the uplink and the downlink radio access systems are not limited to these combinations.

In the radio communication system 1, a downlink shared channel (PDSCH: Physical Downlink Shared Channel), a broadcast channel (PBCH: Physical Broadcast Channel), a downlink L1/L2 control channel and the like shared by the user terminals 20 are used as downlink channels. User data, upper layer control information, SIB (System Information Block) and the like are transmitted by PDSCH. In addition, MIB (Master Information Block) is transmitted by PBCH.

The downlink L1/L2 control channel includes PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel), and the like. Downlink control information (DCI: downlink control information) including scheduling information of PDSCH and PUSCH is transmitted by PDCCH. The number of OFDM symbols used for PDCCH is transmitted by PCFICH. PHICH transmits acknowledgment information (referred to as retransmission control information, HARQ-ACK, ACK/NACK, etc.) of HARQ (Hybrid Automatic Repeat reQuest) to the PUSCH. EPDCCH is frequency division multiplexed with the PDSCH (downlink shared data channel), and is used for transmission such as DCI similarly to PDCCH.

In the radio communication system 1, an uplink shared channel (PUSCH: Physical Uplink Shared Channel), an uplink control channel (PUCCH: Physical Uplink Control Channel), a random access channel (PRACH: Physical Random Access Channel) and the like shared by the user terminals 20 are used as uplink channel. User data and upper layer control information are transmitted by PUSCH. In addition, downlink radio quality information (CQI: Channel Quality Indicator), acknowledgment information and the like are transmitted by PUCCH. A random access preamble is transmitted by PRACH, for establishing a connection with a cell.

In the radio communication system 1, a cell-specific reference signal (CRS), a channel state information reference signal (CSI-RS), a demodulation reference signal (DMRS: DeModulation Reference Signal), a position determination reference signal (PRS: Positioning Reference Signal), and the like are transmitted as downlink reference signals. In addition, in the radio communication system 1, a measurement reference signal (SRS: Sounding Reference Signal), a demodulation reference signal (DMRS), and the like are transmitted as uplink reference signals. DMRS may be referred to as a UE-specific reference signal. Further, the reference signal to be transmitted is not limited to them.

(Radio Base Station)

Figure 8:
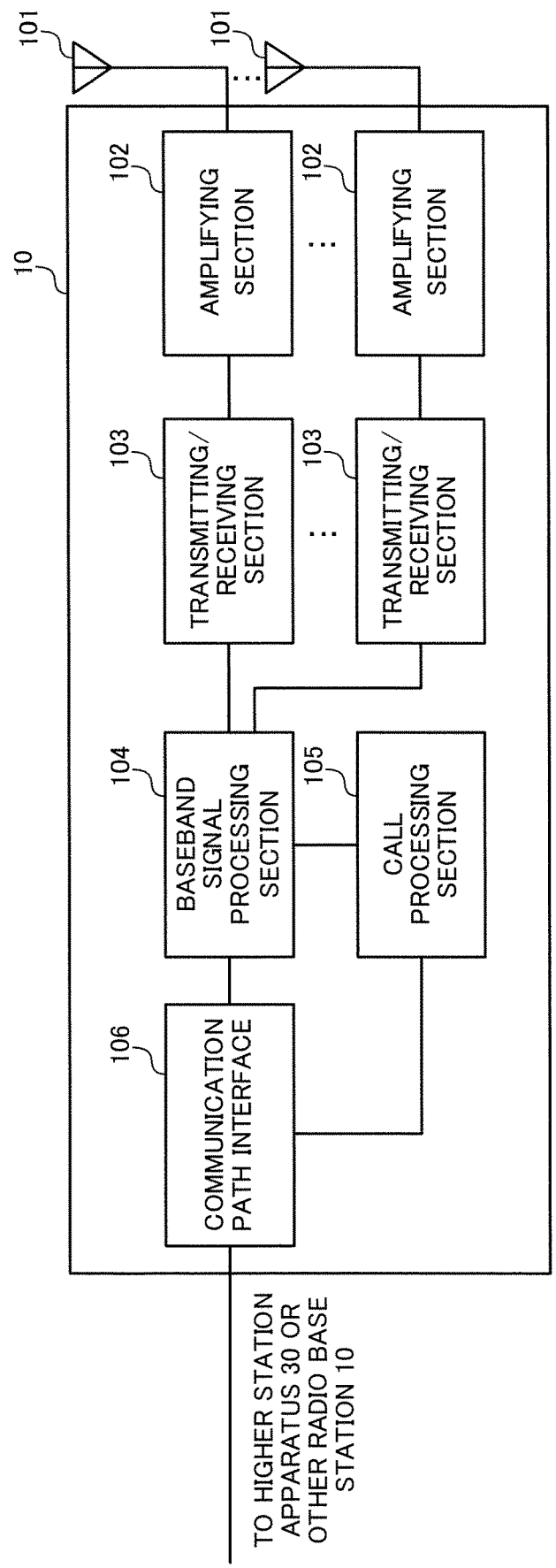
FIG. 8 is a view illustrating an example of an overall configuration of a radio base station according to an embodiment of the present invention.

FIG. 8 is a view illustrating an example of an overall configuration of a radio base station according to an embodiment of the present invention. The radio base station 10 includes a plurality of transmission/reception antennas 101, an amplifier section 102, a transmitting/receiving section 103, a baseband signal processing section 104, a call processing section 105, and a communication path interface 106. Note that one or more transmission/reception antennas 101, amplifier sections 102, and transmitting/receiving sections 103 may be included.

User data transmitted from the radio base station 10 to the user terminal 20 by the downlink is inputted from the higher station apparatus 30 to the baseband signal processing section 104 via the communication path interface 106.

Regarding user data, the baseband signal processing section 104 performs processing of the PDCP (Packet Data Convergence Protocol) layer, division/combination of user data, RLC layer transmission processing such as RLC (Radio Link Control) retransmission control, MAC (Medium Access Control) retransmission control (for example, transmission processing of HARQ), scheduling, transmission format selection, channel coding, inverse fast Fourier transform (IFFT) processing, and transmission processing such as precoding processing, and the user data subjected to these processing is transferred to the transmitting/receiving section 103. The downlink control signal is also subjected to transmission processing such as channel coding and inverse fast Fourier transform, and transferred to the transmitting/receiving section 103.

The transmitting/receiving section 103 converts the baseband signal pre-coded and outputted from the baseband signal processing section 104 for each antenna, into a radio frequency band and transmits such a baseband signal. The radio frequency signal which is frequency-converted by the transmitting/receiving section 103 is amplified by the amplifier section 102 and transmitted from the transmission/reception antenna 101. The transmitting/receiving section 103 may be composed of a transmitter/receiver, a transmission/reception circuit or a transmission/reception device described based on a common recognition in the technical field of the present invention. The transmitting/receiving section 103 may be configured as an integral transmitting/receiving section, or may be configured as a transmission section and a reception section.

On the other hand, regarding the uplink signal, the radio frequency signal received by the transmission/reception antenna 101 is amplified by the amplifier section 102. The transmitting/receiving section 103 receives the uplink signal amplified by the amplifier section 102. The transmitting/receiving section 103 frequency-converts the received signal into a baseband signal and outputs it to the baseband signal processing section 104.

The baseband signal processing section 104 performs processing such as fast Fourier transform (FFT) processing, inverse discrete Fourier transform (IDFT) processing, error correction decoding, reception processing of MAC retransmission control, and reception processing for RLC layer and PDCP layer, to the user data included in the inputted uplink signal, and the user data subjected to these processing is transferred to the higher station apparatus 30 via the communication path interface 106. The call processing section 105 performs call processing such as setting and release of a communication channel, state management of the radio base station 10, and management of the radio resource.

The communication path interface 106 transmits and receives signals to and from the higher station apparatus 30 via a predetermined interface. In addition, the communication path interface 106 may perform transmission/reception of the signal with other radio base station 10 (backhaul signaling) via an inter-base station interface (for example, an optical fiber conforming to CPRI (Common Public Radio Interface), X2 interface).

The transmitting/receiving section 103 transmits downlink control information (for example, DCI) regarding transmission and/or reception of data to the user terminal 20. For example, the transmitting/receiving section 103 may transmit instruction information (DL grant) regarding reception of a downlink shared channel (PDSCH). In addition, the transmitting/receiving section 103 may transmit instruction information (UL grant) regarding transmission of the uplink shared channel (PUSCH). These DCIs may be transmitted at the same TTI or at different TTIs. In addition, these DCIs may be transmitted by the same frequency carrier or by different frequency carriers.

The transmitting/receiving section 103 transmits downlink data (PDSCH) at a predetermined TTI judged (determined) by the control section 301. In addition, the transmitting/receiving section 103 may transmit HARQ-ACK for the uplink data (PUSCH). In addition, the transmitting/receiving section 103 may transmit information regarding scheduling.

The transmitting/receiving section 103 receives the uplink data from the user terminal 20 by an uplink shared channel (for example, PUSCH), at a predetermined TTI judged by the control section 301. The transmitting/receiving section 103 may receive the HARQ-ACK for the downlink data transmitted by the downlink shared channel (PDSCH) based on DCI.

Figure 9:
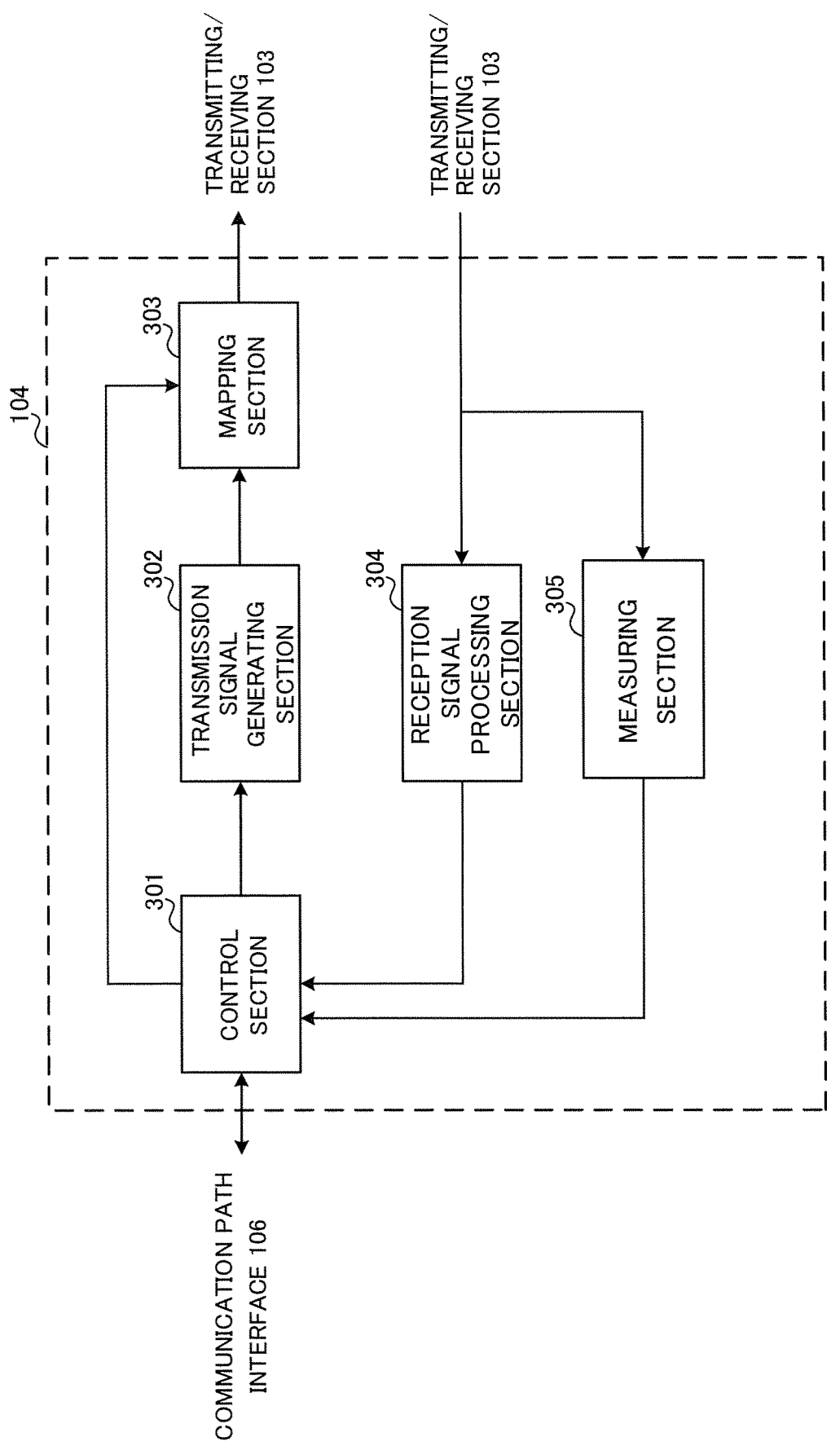
FIG. 9 is a view illustrating an example of a functional configuration of a radio base station according to an embodiment of the present invention.

FIG. 9 is a view illustrating an example of a functional configuration of a radio base station according to an embodiment of the present invention. Note that FIG. 9 mainly illustrates the functional blocks of a characteristic portion in this embodiment, and it is assumed that the radio base station 10 also has other functional blocks required for radio communication. As illustrated in FIG. 9, the baseband signal processing section 104 includes at least a control section (scheduler) 301, a transmission signal generation section 302, a mapping section 303, a reception signal processing section 304, and a measuring section 305.

The control section (scheduler) 301 performs control of the entire radio base station 10. The control section 301 may be constituted of a controller, a control circuit or a control device, which are described based on a common recognition in the technical field of the present invention.

The control section 301 controls, for example, generation of the signal by the transmission signal generation section 302 and assignment of the signal by the mapping section 303. Further, the control section 301 controls signal reception processing by the reception signal processing section 304 and measurement of the signal by the measuring section 305.

The control section 301 controls scheduling (for example, the resource assignment) of the system information, the downlink data signal transmitted by PDSCH, and the downlink control signal transmitted by PDCCH and/or EPDCCH, and also controls scheduling of synchronization signals (Primary Synchronization Signal (PSS)/Secondary Synchronization Signal (SSS)) and downlink reference signals such as CRS, CSI-RS, DMRS and the like.

Further, the control section 301 controls scheduling of an uplink data signal transmitted by PUSCH, an uplink control signal (for example, acknowledgment information) transmitted by PUCCH and/or PUSCH, a random access preamble transmitted by PRACH, an uplink reference signal, and the like.

Specifically, the control section 301 controls to perform data transmission and/or reception corresponding to downlink control information (for example, DCI) transmitted from the transmitting/receiving section 103 at a predetermined TTI (scheduled TTI).

Here, regardless of whether the downlink control information transmitted from the transmitting/receiving section 103 is the UL grant or the DL grant, the control section 301 controls to set the predetermined TTI to the same TTI based on the TTI (scheduling TTI) that has transmitted the downlink control information (first embodiment). The control section 301 may determine to use, for example, the same TTI as the TTI that has transmitted the downlink control information or the TTI that is one TTI later, as the predetermined TTI.

The control section 301 may perform control so as to perform transmission and/or reception of data using the same frequency carrier regardless of whether the downlink control information transmitted from the transmitting/receiving section 103 is the UL grant or the DL grant.

In addition, the control section 301 may perform control so as to perform transmission and/or reception of data corresponding to one of the plurality of downlink control information transmitted at the same TTI. For example, the control section 301 may perform control by ignoring one of the UL grant and the DL grant transmitted at the same TTI.

Further, in data transmission based on the UL grant, the control section 301 controls the processing of the reception signal processing section 304 and/or the measuring section 305 on the assumption that a variable non-transmission period (GP) is included in the scheduling TTI (Second embodiment). For example, the control section 301 may determine the non-transmission period based on the size of the resource indicated by the UL grant, information regarding capability of UE, and the like.

Further, in the scheduling TTI, the control section 301 may control the processing of the reception signal processing section 304 and/or the measuring section 305, on the assumption that the reference signal is transmitted from the user terminal 20 using a predetermined resource regardless of the GP length. Further, the control section 301 may control so as to receive the measurement reference signal (for example, SRS/eSRS) and the acknowledgment information (HARQ-ACK) for the downlink data, after the downlink control information is transmitted, or at a timing when the shortest GP length has elapsed from the start of TTI.

The transmission signal generation section 302 generates a downlink signal (a downlink control signal, a downlink data signal, a downlink reference signal, etc.) based on an instruction from the control section 301, and outputs it to the mapping section 303. The transmission signal generation section 302 may be constituted of a signal generator, a signal generation circuit or a signal generation device, which are described based on a common recognition in the technical field of the present invention.

The transmission signal generation section 302 generates, for example, a DL assignment for reporting downlink signal assignment information and a UL grant for reporting uplink signal assignment information, based on an instruction from the control section 301. In addition, the downlink data signal is subjected to encoding processing and modulation processing according to a coding rate, a modulation system, and the like determined based on channel state information (CSI: Channel State Information) and the like from each user terminal 20.

The mapping section 303 maps the downlink signal generated by the transmission signal generation section 302 on a predetermined radio resource based on the instruction from the control section 301 and outputs it to the transmitting/receiving section 103. The mapping section 303 may be constituted of a mapper, a mapping circuit or a mapping device, which are described based on a common recognition in the technical field of the present invention.

The reception signal processing section 304 performs reception processing (for example, demapping, demodulation, decoding, etc.) to the received signal inputted from the transmitting/receiving section 103. Here, the received signal is, for example, an uplink signal (an uplink control signal, an uplink data signal, an uplink reference signal, etc.) transmitted from the user terminal 20. The reception signal processing section 304 may be constituted of a signal processor, a signal processing circuit or a signal processing device described based on a common recognition in the technical field of the present invention.

The reception signal processing section 304 outputs the information to the control section 301, the information being decoded by reception processing. For example, when PUCCH including HARQ-ACK is received, the reception signal processing section 304 outputs HARQ-ACK to the control section 301. In addition, the reception signal processing section 304 outputs the received signal and the signal after reception processing, to the measuring section 305.

The measuring section 305 performs measurement regarding the received signal. The measuring section 305 may be constituted of a measuring instrument, a measuring circuit or a measuring device, described based on a common recognition in the technical field of the present invention.

The measuring section 305 may measure, for example, a received power (for example, RSRP (Reference Signal Received Power)) of the received signal, a received quality (for example, RSRQ (Reference Signal Received Quality)), a channel state, and the like. Measurement results may be outputted to the control section 301.

(User Terminal)

Figure 10:
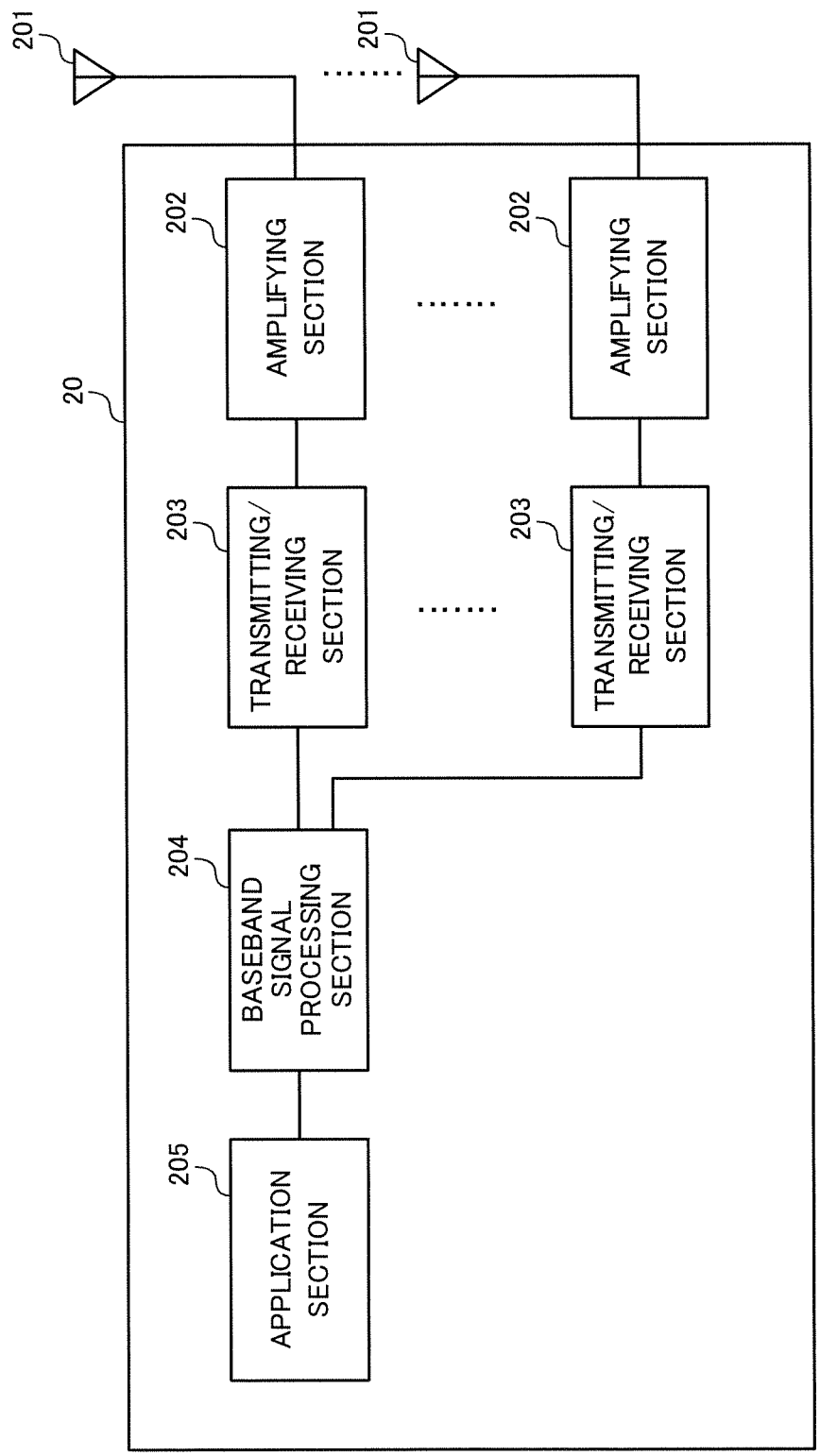
FIG. 10 is a view illustrating an example of an overall configuration of a user terminal according to an embodiment of the present invention.

FIG. 10 is a diagram illustrating an example of an overall configuration of a user terminal according to an embodiment of the present invention. The user terminal 20 includes a plurality of transmission/reception antennas 201, an amplifier section 202, a transmitting/receiving section 203, a baseband signal processing section 204, and an application section 205. Note that one or more transmission/reception antennas 201, amplifier sections 202, and transmitting/receiving sections 203 may be included.

The radio frequency signal received by the transmission/reception antenna 201 is amplified by the amplifier section 202. The transmitting/receiving section 203 receives the downlink signal amplified by the amplifier section 202. The transmitting/receiving section 203 frequency-converts the received signal into a baseband signal, and outputs it to the baseband signal processing section 204. The transmitting/receiving section 203 may be constituted of a transmitter/receiver, a transceiver circuit or a transceiver device, described based on a common recognition in the technical field of the present invention. Note that the transmitting/receiving section 203 may be configured as an integrated transmitting/receiving section, or may be configured including a transmission section and a reception section.

The baseband signal processing section 204 performs FFT processing, error correction decoding, reception processing for retransmission control and the like, to the input baseband signal. The downlink user data is transferred to the application section 205. The application section 205 performs processing regarding layers higher than a physical layer and a MAC layer. In addition, broadcast information in the downlink data is also transferred to the application section 205.

On the other hand, uplink user data is inputted from the application section 205 to the baseband signal processing section 204. In the baseband signal processing section 204, transmission processing for retransmission control (for example, transmission processing of HARQ), channel encoding, precoding, discrete Fourier transform (DFT) processing, IFFT processing and the like are performed, and the processed baseband signal is transferred to the transmitting/receiving section 203. The transmitting/receiving section 203 converts the baseband signal outputted from the baseband signal processing section 204 into a radio frequency band and transmits the converted baseband signal. The radio frequency signal which is frequency-converted by the transmitting/receiving section 203 is amplified by the amplifier section 202 and transmitted from the transmission/reception antenna 201.

In addition, the transmitting/receiving section 203 transmits the uplink data to the radio base station 10 using the uplink shared channel (for example, by PUSCH) at a predetermined TTI determined by the control section 401. The transmitting/receiving section 203 may transmit HARQ-ACK for the downlink data transmitted by the downlink shared channel (PUSCH) based on DCI.

The transmitting/receiving section 203 receives DCI regarding transmission and/or reception of data from the radio base station 10. For example, the transmitting/receiving section 203 may receive instruction information (DL grant) regarding reception of the downlink shared channel (PDSCH). Further, the transmitting/receiving section 203 may receive instruction information (UL grant) regarding transmission of the uplink shared channel (PUSCH). These DCIs may be received at the same TTI or at different TTIs. In addition, these DCIs may be received using the same frequency carrier or using different frequency carriers.

The transmitting/receiving section 203 receives downlink data (PDSCH) at a predetermined TTI judged by the control section 401. Further, the transmitting/receiving section 203 may receive HARQ-ACK for the uplink data (PUSCH).

Further, the transmitting/receiving section 203 may receive information regarding scheduling.

Figure 11:
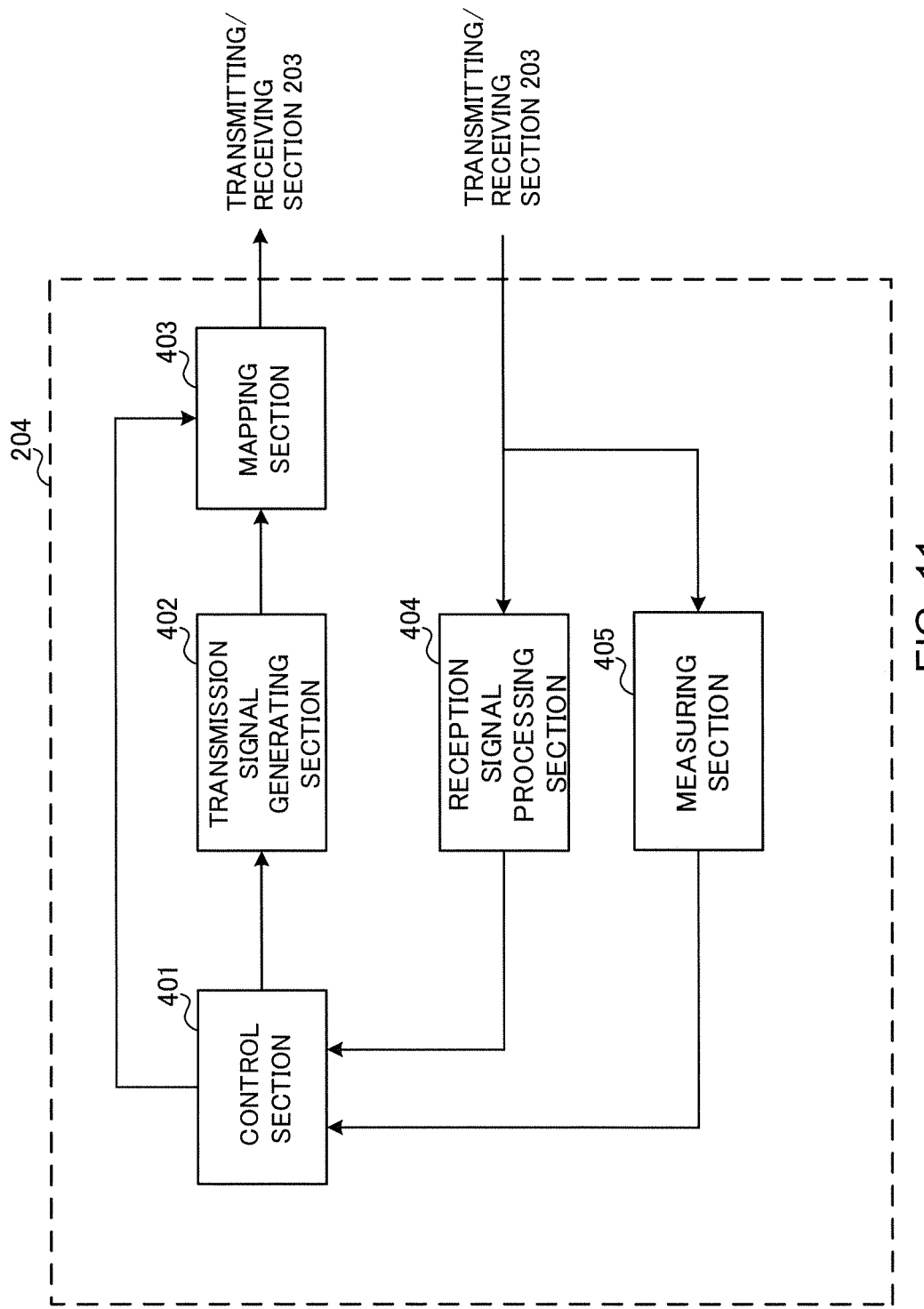
FIG. 11 is a view illustrating an example of a functional configuration of a user terminal according to an embodiment of the present invention.

FIG. 11 is a view illustrating an example of a functional configuration of a user terminal according to an embodiment of the present invention. In FIG. 11, the functional blocks of the characteristic parts in this embodiment are mainly illustrated, and it is assumed that the user terminal 20 also has other functional blocks for radio communication. As illustrated in FIG. 11, the baseband signal processing section 204 included in the user terminal 20 includes at least a control section 401, a transmission signal generation section 402, a mapping section 403, a reception signal processing section 404, and a measuring section 405.

The control section 401 controls the entire user terminal 20. The control section 401 may be constituted of a controller, a control circuit or a control device, described based on a common recognition in the technical field of the present invention.

The control section 401 controls, for example, generation of a signal by the transmission signal generation section 402 and assignment of a signal by the mapping section 403. Further, the control section 401 controls signal reception processing by the reception signal processing section 404 and measurement of signals by the measuring section 405.

The control section 401 obtains from the reception signal processing section 404, a downlink control signal (signal transmitted by PDCCH/EPDCCH) and a downlink data signal (signal transmitted by PDSCH) which are transmitted from the radio base station 10. The control section 401 controls the generation of an uplink control signal (for example, acknowledgment infoiination and the like) and the generation of an uplink data signal based on a result, etc., of judging whether or not retransmission control is required for the downlink data signal.

Specifically, the control section 401 performs control such that transmission and/or reception of data corresponding to the downlink control information (for example, DCI) obtained from the reception signal processing section 404 is performed at a predetermined TTI (scheduled TTI).

Here, even when the downlink control information received by the reception signal processing section 404 is the UL grant or the DL grant, the control section 401 controls to set the predetermined TTI to the same TTI based on the TTI (scheduling TTI) that has received the downlink control information. Further, the control section 401 may determine to use, for example, the same TTI as the TTI that has received the downlink control information or the following TTI (for example, one TTI later), as the predetermined TTL The control section 401 may control to perform transmission and/or reception of data using the same frequency carrier regardless of whether the downlink control information received by the reception signal processing section 404 is the UL grant or the DL grant.

Further, when a plurality of downlink control information received at the same TTI is inputted from the reception signal processing section 404, the control section 401 may control to perform transmission and/or reception of data by regarding one of the grants as valid. For example, the control section 401 may perform control by ignoring one of the UL grant and the DL grant received at the same TTI.

Further, in data transmission based on the UL grant, the control section 401 may control to set a variable non-transmission period (GP) in the scheduling TTI (second embodiment). For example, the control section 401 may determine the non-transmission period based on the size of the resource instructed by the UL grant, the TBS, or the like.

Further, when the signal is transmitted at the scheduling TTI, the control section 401 may control so that the reference signal is transmitted using a predetermined resource regardless of the GP length. Further, the control section 401 may control so as to transmit the measurement reference signal (for example, SRS/eSRS) or the acknowledgment information (HARQ-ACK) for the downlink data after the downlink control information is received or at the timing when the shortest GP length has elapsed from the start of TTI.

In addition, when information regarding scheduling (for example, the number of TTIs from the scheduling TTI to the scheduled TTI) is obtained from the reception signal processing section 404, the control section 401 may update the parameters used for the control, based on this information.

The transmission signal generation section 402 generates an uplink signal (an uplink control signal, an uplink data signal, an uplink reference signal, etc.) based on an instruction from the control section 401, and outputs it to the mapping section 403. The transmission signal generation section 402 may be constituted of a signal generator, a signal generation circuit or a signal generation device, described based on a common recognition in the technical field of the present invention.

The transmission signal generation section 402 generates an uplink control signal regarding acknowledgment information and channel state information (CSI) based on an instruction from the control section 401 for example. In addition, the transmission signal generation section 402 generates an uplink data signal based on an instruction from the control section 401. For example, when the UL grant is included in the downlink control signal reported from the radio base station 10, the transmission signal generation section 402 is instructed by the control section 401 to generate the uplink data signal.

The mapping section 403 maps the uplink signal generated by the transmission signal generation section 402 on a radio resource based on an instruction from the control section 401, and outputs the mapped radio resource to the transmitting/receiving section 203. The mapping section 403 may be constituted of a mapper, a mapping circuit or a mapping device, described based on a common recognition in the technical field of the present invention.

The reception signal processing section 404 performs reception processing (for example, demapping, demodulation, decoding, etc.) to the received signal inputted from the transmitting/receiving section 203. Here, the received signal is, for example, a downlink signal (a downlink control signal, a downlink data signal, a downlink reference signal, etc.) transmitted from the radio base station 10. The reception signal processing section 404 may be constituted of a signal processor, a signal processing circuit or a signal processing device, described based on a common recognition in the technical field of the present invention. Further, the reception signal processing section 404 constitutes the reception section of the present invention.

The reception signal processing section 404 blind-decodes DCI (DCI format) for scheduling transmission and/or reception of data of a predetermined TTI (TB: Transport Block) based on an instruction from the control section 401. For example, the reception signal processing section 404 may decode the DCI by performing a demasking processing using a predetermined identifier (RNTI: Radio Network Temporary Identifier), or may decode the DCI assuming a predetermined payload size.

The reception signal processing section 404 outputs the information decoded by the reception processing to the control section 401. The reception signal processing section 404 outputs, for example, broadcast information, system information, RRC signaling, DCI, and the like, to the control section 401. In addition, the reception signal processing section 404 outputs the received signal and the signal after the reception processing to the measuring section 405.

The measuring section 405 performs measurement regarding the received signal. The measuring section 405 may be constituted of a measuring device, a measuring circuit or a measuring device, described based on a common recognition in the technical field of the present invention.

For example, the measuring section 405 may measure the received power (for example, RSRP), the received quality (for example, RSRQ), the channel state, and the like of the received signal. The measurement result may be outputted to the control section 401.

Note that the block diagram used in the description of the above embodiment shows blocks of functional sections. These functional blocks (constituent parts) are realized by arbitrary combination of hardware and software. Means for realizing each functional block is not particularly limited. In other words, each functional block may be realized by one physically coupled device, or may be realized by a plurality of devices by connecting two or more physically separated devices by wired or wireless connection.

For example, some or all of the functions of the radio base station 10 and the user terminal 20 may be realized by using hardware such as ASIC (Application Specific Integrated Circuit), PLD (Programmable Logic Device), and FPGA (Field Programmable Gate Array), etc. Further, the radio base station 10 and the user terminal 20 may be realized by a computer device including a processor (CPU: Central Processing Unit), a communication interface for network connection, a memory, and a computer readable storage medium holding a program. In other words, the radio base station, the user terminal, and the like according to an embodiment of the present invention may function as a computer that performs processing of the radio communication method of the present invention.

Here, the processor, the memory and the like are connected by a bus for communicating information. The computer-readable recording medium is the recording medium, for example such as a flexible disk, a magneto-optical disk, a ROM (Read Only Memory), an EPROM (Erasable Programmable ROM), a CD-ROM (Compact Disc-ROM), a RAM (Random Access Memory) and a hard disk. Further, the program may be transmitted from the network via an electric communication line. Further, the radio base station 10 and the user terminal 20 may include an input device such as an input key and an output device such as a display.

Functional configurations of the radio base station 10 and the user terminal 20 may be realized by the above-described hardware, by a software module executed by a processor, or may be realized by a combination of both. The processor operates the operating system to control the entire user terminal. In addition, the processor reads programs, software modules and data from the storage medium to the memory, and executes various processes according to them.

Here, the program may be the program that causes a computer to execute the operations described in the above embodiments. For example, the control section 401 of the user terminal 20 may be realized by a control program which is stored in a memory and which is operated by a processor, and other functional block may be similarly realized.

Further, software and instructions, etc. may be transmitted and received via a transmission medium. For example, when the software is transmitted from a website, server, or other remote source using wired technologies such as coaxial cable, fiber optic cable, twisted pair and digital subscriber line (DSL) and/or wireless technologies such as infrared, radio and microwave, these wired and/or wireless technologies are included within the definition of the transmission medium.

Terms described in this specification and/or terms necessary for understanding this specification may be replaced with terms having the same or similar meanings. For example, the channel and/or symbol may be a signal (signaling). In addition, the signal may be a message. In addition, the component carrier (CC) may be referred to as a frequency carrier, a carrier frequency, a cell, or the like.

In addition, the information, parameters, and the like described in this specification may be expressed by an absolute value, may be expressed as a relative value with respect to a predetermined value, or may be expressed by another corresponding information. For example, the radio resource may be indicated by an index.

The information and signals, etc. described herein may be expressed using any one of a variety of different technologies. For example, data, instructions, commands, information, signals, bits, symbols, and chips, etc. that may be mentioned throughout the above description may be represented by voltages, currents, electromagnetic waves, magnetic fields or particles, optical fields or photons, or may be expressed by a combination of them.

Each aspect/embodiment described in this specification may be used singly or in combination, or may be used by being switched during execution. Further, notification of predetermined information (for example, notification of "being X") is not limited to being performed explicitly, but may be performed implicitly (for example, by not performing notification of the predetermined information).

Informational notification is not limited to the aspects/embodiments described in this specification, and may be performed in other ways. For example, the notification of information may be performed by physical layer signaling (for example, DCI (Downlink Control Information), UCI (Uplink Control Information)), upper layer signaling (for example, RRC (Radio Resource Control) signaling, MAC (Medium Access Control) signaling, broadcast information (MIB (Master Information Block), SIB (System Information Block))), other signals, or a combination thereof. In addition, the RRC signaling may be referred to as an RRC message, for example, may be referred to as an RRC connection setup (RRCConnectionSetup) message, an RRC connection reconfiguration (RRCConnectionReconfiguration) message, or the like.

Each aspect/embodiment described in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-Wide Band), Bluetooth (registered trademark), or other suitable system and/or next-generation systems expanded based on them.

As long as there is no inconsistency, the order of processes, sequences, flowcharts and the like of each aspect/embodiment described in this specification may be exchanged. For example, for the methods described herein, the elements of the various steps are presented in an exemplary order and are not limited to the presented specific order.

Although the present invention has been described in detail above, it will be apparent to those skilled in the art that the present invention is not limited to the embodiments described in this specification. The present invention may be corrected and modified without departing from the gist and the scope of the present invention defined by the description of the claims. Accordingly, the description of the present specification is for the purpose of exemplification and does not have any restrictive meaning to the present invention.

The present application is based on Japanese Patent Application No. 2015-171452 filed on Aug. 31, 2015, the entire contents of which are hereby incorporated by reference.

The invention claimed is:

1. A terminal, comprising:
   a receiver that receives Downlink Control Information (DCI) for scheduling a Physical Uplink Shared Channel (PUSCH);
   a processor that controls to determine a non-transmission period based on a processing capability of the terminal for PUSCH; and
   a transmitter to transmit the scheduled PUSCH, based on the DCI, on a time period after the determined non-transmission period.

2. The terminal according to claim 1, wherein the processor controls to transmit a reference signal on the time period after the non-transmission period.

3. A radio communication method for a terminal, the radio communication method comprising:
   receiving Downlink Control Information (DCI) for scheduling a Physical Uplink Shared Channel (PUSCH);
   controlling to determine a non-transmission period based on a processing capability of the terminal for PUSCH; and
   transmitting the scheduled PUSCH, based on the DCI, on a time period after the determined non-transmission period.

* * * * *